(12) United States Patent
Ratte et al.

(10) Patent No.: US 7,390,364 B2
(45) Date of Patent: Jun. 24, 2008

(54) SYSTEM AND METHOD FOR RECLAIMING AND REUSE OF VEHICLE

(75) Inventors: Robert W. Ratte, North Oaks, MN (US); David P. Zinschlag, Stillwater, MN (US)

(73) Assignee: Water Gremlin Company, White Bear Lake, MN (US)

( * ) Notice: Subject to any disclaimer, the term of this patent is extended or adjusted under 35 U.S.C. 154(b) by 192 days.

(21) Appl. No.: 11/116,462

(22) Filed: Apr. 28, 2005

(65) Prior Publication Data

US 2005/0186350 A1   Aug. 25, 2005

Related U.S. Application Data

(62) Division of application No. 10/278,280, filed on Oct. 23, 2002, now Pat. No. 6,908,640.

(51) Int. Cl.
*B05C 11/10* (2006.01)
*B05C 5/02* (2006.01)

(52) U.S. Cl. .................. 118/603; 118/610; 118/61; 118/326; 118/DIG. 7

(58) Field of Classification Search ............ 118/61, 118/300, 326, 603, 610, DIG. 7; 210/263, 210/805, 195.1; 427/345, 352, 421.1
See application file for complete search history.

(56) References Cited

U.S. PATENT DOCUMENTS

| | | | | |
|---|---|---|---|---|
| 3,847,118 A | * | 11/1974 | Ambry | 118/602 |
| 4,469,720 A | * | 9/1984 | Morris | 427/345 |
| 4,480,393 A | * | 11/1984 | Flink et al. | 34/468 |
| 4,600,608 A | * | 7/1986 | Ankrett | 427/424 |
| 4,859,216 A | * | 8/1989 | Fritsch | 95/142 |
| 6,506,448 B1 | * | 1/2003 | Minogue | 427/216 |
| 7,029,589 B2 | * | 4/2006 | McGinness | 210/758 |

* cited by examiner

*Primary Examiner*—Laura Edwards
(74) *Attorney, Agent, or Firm*—Perkins Coie LLP

(57) ABSTRACT

A system and method of coating articles with the method comprising directing a plurality of articles into an enclosure; applying a vehicle carrying a first agent onto the plurality of articles; converted the vehicle into a gaseous state to leave the first agent on each the plurality of articles; collecting the vehicle in the gaseous state; converting the vehicle in the gaseous state back into a reclaimed state to enable one to add a further agent to the reclaimed vehicle so that one can apply the reclaimed vehicle and a further agent onto a further set of articles.

7 Claims, 1 Drawing Sheet

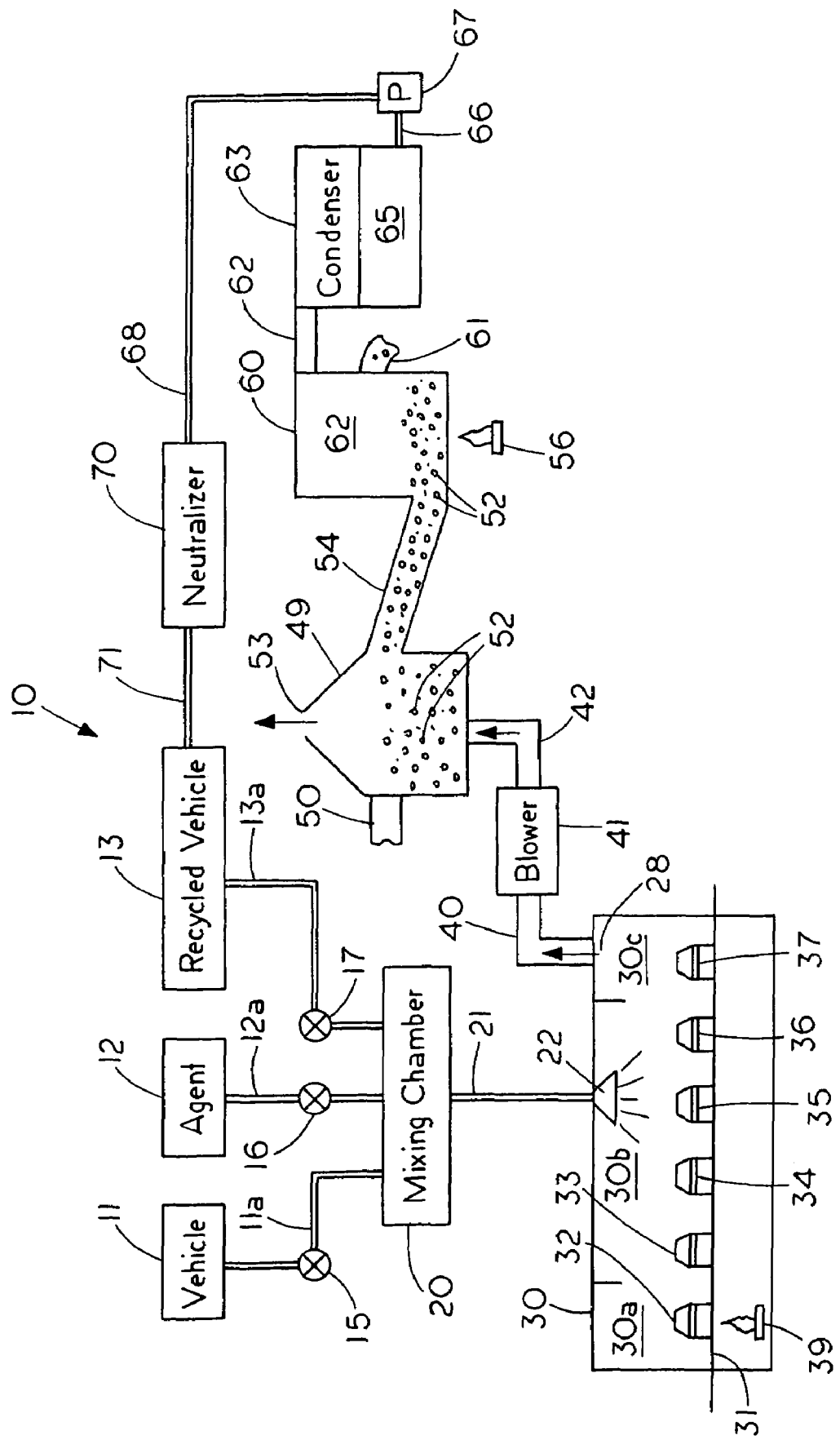

SYSTEM AND METHOD FOR RECLAIMING AND REUSE OF VEHICLE

CROSS REFERENCE TO RELATED APPLICATIONS

This application is a divisional of U.S. application Ser. No. 10/278,280 filed Oct. 23, 2002, now U.S. Pat. No. 6,908,640.

FIELD OF THE INVENTION

This invention relates generally a recycle or reclamation system and, more particularly, to a battery part coating system wherein the vehicle used to deposit an agent on the article is reclaimed for reuse in depositing other agents onto other parts.

STATEMENT REGARDING FEDERALLY SPONSORED RESEARCH OR DEVELOPMENT

None

REFERENCE TO A MICROFICHE APPENDIX

None

BACKGROUND OF THE INVENTION

The concept of coating articles in order to enhance the operation of the article is generally known in the art. In general a vehicle carrying an agent is applied to an article. When the vehicle dries the agent remains secured to the article. Unfortunately, one of the by products of such coating is that the vehicle, which is lost during the process, may be costly as well as hazardous if the vehicle is released into the atmosphere. The present invention allows one to reclaim the vehicle for reuse in depositing agents on other parts as well as to substantially eliminate any hazardous vehicle emissions.

One of the areas where coating an article after the article has been cast is in the art of manufacturing battery parts. Typically, battery parts form an interface between the interior of the battery and the exterior of the battery. If one does not obtain a fluid tight seal between the battery part and the battery container electrolyte can leak out along the battery part. In order to prevent leakage the battery parts such as battery terminals are coated with a sealing agents that help prevent leakage of electrolyte from the battery.

SUMMARY OF THE INVENTION

Briefly, the present invention comprises a system and method of coating articles with the method comprising directing a plurality of articles into an enclosure; applying a vehicle carrying a first agent onto the plurality of articles; converted the vehicle into a gaseous state while leaving the first agent on each the plurality of articles; collecting the vehicle in the gaseous state; reclaiming the vehicle by converting the vehicle in the gaseous state into a reclaimed liquid state to enable one to add a further agent to the reclaimed liquid vehicle to enable one to apply the reclaimed liquid vehicle and a further agent onto a further plurality of articles.

BRIEF DESCRIPTION OF THE DRAWINGS

FIG. 1 is a schematic of the system for coating articles with recycled or reclaimed vehicle.

DESCRIPTION OF THE PREFERRED EMBODIMENT

Referring to FIG. 1 reference numeral 10 generally identifies a partial schematic of the system for coating articles, such as battery parts, with a recycled or reclaimed vehicle carrying a coating agent. The system includes a first source of liquid vehicle 11, an agent 12 for mixing with the vehicle and a source of recycled liquid vehicle 13. Located in fluid communication with the vehicle and agent sources is a mixing chamber 20. Vehicle 11 flows into a mixing chamber 20 through a conduit 11a and a control valve 15. Similarly agent 12a flows into mixing chamber 20 through a conduit 12a and a control valve 16 and reclaimed or recycled vehicle 13 flows into mixing chamber 20 through a conduit 13a and a control valve 17. By controlling the valves one can draw vehicle and agent into the mixing chamber 20 where the vehicle preferably in liquid state can absorb and carry the agent so that one can apply the agent to an article such as a battery part using the vehicle as the carrier.

In operation of the system for coating battery parts, typically known vehicles or solvents such as trichloylethene, perchloroethylene, toluene or xylene can be used since they do not interfere with the lead in the battery parts. Agents which are typically used to coat battery parts are materials such as wood resin or other commercial available materials one which is known as Oppanol, which is sold by BASF AG of Ludwigshafen Germany, chlorinated polefin, titantiaum dioxide or any other battery coating adhesive. The agents are typically used to enhance the sealing of the battery part to the container to thereby prevent leakage of electrolyte from the finished battery. In the preferred embodiment of coating battery parts evaporation temperatures of the vehicle are limited in order to prevent alteration of the battery part as well as the trichloroethylene which is the preferred vehicle to carry one or more of the agents that are applied to the battery part.

In start up operation of the system the vehicle 11 and agent are directed through valves 15 and 16 into mixing chamber 20 where the vehicle and agent are mixed to obtain a liquid vehicle carrying the agent to be applied to the part.

Located proximate the mixing chamber 20 is a work station 30 where parts are coated with the agent 12. Work station 30 includes a conveyor 31 for carrying parts, such as battery parts, through the work station with the work station containing three stages, a first heating stage 30a, a second vehicle and agent application stage 30b and a third vehicle evaporation stage 30c. Located on conveyor 31 are a plurality of battery parts 32, 33, 34, 35, 36 and 37. Battery part 32 is located in the first stage of the work station 30. A heat source 39 in the first stage provides heat for elevating the temperature of the battery part 32. The temperature of the battery part is elevated above room temperature to enhance the evaporation of vehicle from the battery part. The elevation of the temperature is determined by the type of vehicle as well as the part being coated. For example, the temperature of the battery part should not be elevated so as to produce permanent changes in the configuration of the battery part or the grain structure of the battery part. Similarly, care should be taken so that the vehicle does not get heated to a temperature where the chemical bonds of the vehicle are broken and unwanted by products are generated. If heating is maintained below chemical breakdown of the vehicle as well as breakdown down of the part the vehicle can be subsequently recovered for reuse.

In operation of station 30, after the part 32 is heated the part enters the second stage, namely, the coating area where a nozzle 22 sprays liquid vehicle containing an agent onto heated parts 34, 35 and 36. Once the parts are coated, they enter the last stage 30*c* of the work station where the vehicle is allowed to evaporate into an enclosure or hood that collects the evaporate. Part 37 is shown in the final stage 30*c* of the work station 30 with the vaporized vehicle 28 being drawn into exhaust passage 40 by blower 41.

Thus work station 30 contains three stages, a heating stage 30*a*, a coating stage 30*b* and a vaporizing stage 30*c*. While the system is shown with use of a heating stage to accelerate the evaporation of the vehicle other methods of hastening evaporation could be used. For example, if the pressure within the work station were lower or a vacuum was drawn the liquid vehicle would evaporate quickly. An advantage of enhancing evaporation by directing the parts through a vacuum is that the vehicle that evaporates could be collected in concentrated form in the work station and subsequently condensed into liquid form without having to separate the gas in the work station from the vehicle. In most operation the work station 30 contains an air atmosphere; however, if needed the gas within the work station could be other than an air atmosphere.

Once the vehicle is drawn into conduit 40 by blower 41 the gas, which is usually air, that carries the vaporized vehicle therein is directed upward into a fluidized bed 49 containing beads of charcoal 52. The charcoal beads 52 are fed into the fluidized bed through an inlet 50 and flow out of fluidized bed 49 through a discharge conduit 54. As the gas which contains the vehicle flows through the fluidized charcoal bed the charcoal particles removes the vehicle from the air allowing the cleaned air to be discharged through a vent passage 53.

The charcoal particles 52, which have now collected the vehicle, are directed to a separation chamber 60 where the particles 52 are heated by a heater 56 to drive the vehicle in the charcoal into chamber 60. The vaporized vehicle 67 is then directed into duct 62 which carries the vaporized vehicle to condenser 63. As chamber 60 is maintained in a closed condition it captures the vehicle that is evaporated from the charcoal particles or beads. Once the charcoal particles have been heated to separate the vehicle there from the charcoal beads are discharge through passage 61 for reuse in collecting vehicle.

In operation of the reclamation or recycle system the concentrated atmosphere of vehicle 67 in the gaseous state in chamber 60 is directed through a passage 62 into a condenser 63 which converts the vehicle in the gaseous state back into the liquid state. The condensed liquid vehicle 65 then flows into pipe 66 where a pump 67 or gravity sends the vehicle though a passage 68 into a neutralizing station 70 where the vehicle can be neutralized in the event that any acids may have formed during the vaporization of the vehicle. The reclaimed vehicle is then directed into passage 71 into recycle or reclaim vehicle container 13.

Once the recycled liquid vehicle 13 begins arriving, one can shut off the source of liquid vehicle 11 by closing valve 15. One then opens valves 17 to allow the reclaimed vehicle 13 to mix with the agent 12 in the mixing chamber 20. The operation of the application of the system can now be done with the use of only recycled or reclaimed vehicle. Thus the on-the-go reclamation of the vehicle and the on-the-go mixing of the agent and vehicle provide for continuous recycling of the vehicle to permit repeated reuse of the vehicle in applying agent to the part.

As described above the present invention comprises a method for coating articles such as battery parts comprising: directing a plurality of battery parts into an enclosure: spraying a vehicle carrying a first agent onto the plurality of battery parts; heating each of the plurality of battery parts until the vehicle evaporates into a gas in the enclosure to leave the agent on each of the battery parts; directing the gas carrying the vaporized vehicle through a bed of charcoal to collect the vaporized vehicle from the gas; directing the charcoal with the collected vehicle into a chamber; heating the charcoal in the chamber to a temperature sufficient to vaporize the vehicle in the charcoal into the chamber; cooling the vaporized vehicle to condense the vaporized vehicle as a liquid;collecting the liquid vehicle; and adding a further agent to the liquid vehicle; spraying the liquid vehicle and a further agent onto a further plurality of battery parts.

The system 10 for recapturing vehicle used in applying coatings to battery parts includes a work station 30 for directing battery parts therethrough; an applicator, such as a nozzle 22, for applying a vehicle containing an agent to a surface of a battery part; a discharge vent for removing a vaporized vehicle from the work station 30; a work station 60 for converting the vaporized vehicle into a liquid state; and a further work station 20 comprising a mixing chamber for mixing the vaporized vehicle in the liquid state with a further agent to use the reclaimed vehicle to apply the agent to the parts.

We claim:

1. A system for recapturing vehicle used in applying coatings to battery parts comprising:

a work station for directing battery parts therethrough;

an applicator for applying a vehicle containing an agent to a surface of a battery part;

a discharge vent for removing a vaporized vehicle from the work station;

a work station for removing the vehicle from a gas in the system comprising a fluidized bed of charcoal particles for removing the vehicle, said work station having a vent for discharging air from the gas in the system and a conduit for discharging the charcoal particles with the vehicle;

a work station for heating the charcoal particles with the vehicle to remove the vehicle therefrom;

a work station for recapturing the vehicle by converting the vaporized vehicle into a liquid state; and a further work station for mixing the recaptured vehicle in the liquid state with a further agent to enable the application of the recaptured vehicle and the further agent to a battery part.

2. The system of claim 1 wherein the work station for directing battery parts therethrough includes a heater for heating the battery part.

3. The system of claim 1 wherein the applicator comprises a spray nozzle for directing the vehicle onto the battery part.

4. The system of claim 1 wherein the work station for converting the vehicle into a liquid state comprises a condenser.

5. The system of claim 1 including a neutralizing station for neutralizing any acids in the reclaimed vehicle.

6. The system of claim 1 wherein the system is closed to prevent vehicle from escaping therefrom.

7. The system of claim 1 wherein the vehicle comprises trichloroethylene.

* * * * *

UNITED STATES PATENT AND TRADEMARK OFFICE
CERTIFICATE OF CORRECTION

PATENT NO. : 7,390,364 B2  Page 1 of 1
APPLICATION NO. : 11/116462
DATED : June 24, 2008
INVENTOR(S) : Ratte et al.

It is certified that error appears in the above-identified patent and that said Letters Patent is hereby corrected as shown below:

On the Title page, in field (57), under "Abstract", in column 2, line 5, after "each" insert -- of --.

In column 1, line 33, delete "by products" and insert -- byproducts --, therefor.

In column 1, line 57, after "each" insert -- of --.

In column 2, line 22, delete "trichloylethene" and insert -- trichloroethylene --, therefor.

In column 2, line 28, delete "titantiaum" and insert -- titanium --, therefor.

In column 2, line 60, delete "by products" and insert -- byproducts --, therefor.

In column 4, lines 11-12, delete "liquid;collecting" and insert -- liquid; collecting --, therefor.

Signed and Sealed this

Seventeenth Day of March, 2009

JOHN DOLL
*Acting Director of the United States Patent and Trademark Office*